(12) United States Patent
Hermes et al.

(10) Patent No.: US 9,885,590 B2
(45) Date of Patent: Feb. 6, 2018

(54) METHOD FOR ASCERTAINING A POSITION OF A ROTOR OF AN ELECTRICAL MACHINE

(71) Applicant: Robert Bosch GmbH, Stuttgart (DE)

(72) Inventors: Henning Hermes, Wolfach (DE); Florian Schmitt, Winnenden (DE); Ulrich Foerch, Ludwigsburg (DE); Udo Schulz, Vaihingen/Enz (DE); Tobias Friedl, Filderstadt (DE); Ulf Mueller, Schwieberdingen (DE); Achim Jenne, Oberaichen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/218,474

(22) Filed: Jul. 25, 2016

(65) Prior Publication Data

US 2017/0030740 A1    Feb. 2, 2017

(30) Foreign Application Priority Data

Jul. 31, 2015    (DE) .......................... 10 2015 214 596

(51) Int. Cl.
*G01D 5/20*    (2006.01)
*H02P 9/00*    (2006.01)

(52) U.S. Cl.
CPC ............. *G01D 5/20* (2013.01); *G01D 5/2006* (2013.01); *H02P 9/009* (2013.01)

(58) Field of Classification Search
CPC ............ G01R 19/0092; G01R 27/2611; B29C 66/7212; G01N 27/02; G01N 27/025
USPC ........................................................... 324/654
See application file for complete search history.

(56) References Cited

U.S. PATENT DOCUMENTS

| | | | | |
|---|---|---|---|---|
| 2,700,739 A | * | 1/1955 | Orlando | H02K 24/00 310/166 |
| 2,986,714 A | * | 5/1961 | Smith | G01D 5/20 336/30 |
| 3,203,494 A | * | 8/1965 | Roberts | G01D 5/20 177/1 |
| 3,204,235 A | * | 8/1965 | De Rosa | G01D 5/20 341/15 |
| 3,230,407 A | * | 1/1966 | Marsh, Jr. | G01D 5/20 310/111 |
| 3,558,946 A | * | 1/1971 | Cory | G01P 15/132 310/112 |
| 3,732,449 A | * | 5/1973 | Oishi | B01J 19/088 310/156.32 |
| 3,806,785 A | * | 4/1974 | DeValroger | H02K 29/12 318/400.02 |
| 5,007,494 A | * | 4/1991 | Ohmura | B62D 7/148 180/404 |

(Continued)

*Primary Examiner* — Jermele M Hollington
*Assistant Examiner* — Christopher McAndrew
(74) *Attorney, Agent, or Firm* — Norton Rose Fulbright US LLP; Gerard Messina

(57) ABSTRACT

A method for ascertaining a position of a rotor relative to a stator of an electrical machine having a permanently excited rotor and a plurality of windings for the stator or vice versa; in response to an energization of at least one of the windings, a change in an inductance of the winding being ascertained; and, on the basis of the change in the inductance of the winding, the position of the rotor being ascertained relative to the stator.

9 Claims, 3 Drawing Sheets

(56) References Cited

U.S. PATENT DOCUMENTS

| | | | | |
|---|---|---|---|---|
| 5,068,582 A * | 11/1991 | Scott | ............... | H02P 6/182 318/400.05 |
| 5,295,550 A * | 3/1994 | Chikuma | ............... | B62D 6/02 180/412 |
| 7,411,388 B2 * | 8/2008 | Sagoo | ............... | G01D 5/2033 324/207.15 |
| 8,258,782 B2 * | 9/2012 | Kaita | ............... | G01B 7/30 310/112 |
| 8,912,807 B2 * | 12/2014 | Chamarti | ............... | G01R 15/181 324/654 |
| 9,464,919 B2 * | 10/2016 | Sugino | ............... | G01D 5/20 |
| 2002/0167384 A1 * | 11/2002 | Paris | ............... | G01R 33/387 335/299 |
| 2003/0164654 A1 * | 9/2003 | Thaxton | ............... | F16C 32/0459 310/90.5 |
| 2007/0046126 A1 * | 3/2007 | Sagoo | ............... | G01D 5/2033 310/168 |
| 2007/0201842 A1 * | 8/2007 | Earnshaw | ............... | H02K 25/00 388/800 |
| 2007/0278875 A1 * | 12/2007 | Haga | ............... | H02K 3/522 310/71 |
| 2008/0216782 A1 * | 9/2008 | Stork | ............... | F01L 1/352 123/90.17 |
| 2008/0253899 A1 * | 10/2008 | Nakanishi | ............... | F02M 37/106 417/44.11 |
| 2010/0052451 A1 * | 3/2010 | Lee | ............... | H02K 1/16 310/113 |
| 2016/0069710 A1 * | 3/2016 | Ausserlechner | ............... | G01D 5/20 324/207.23 |
| 2016/0091448 A1 * | 3/2016 | Soleimani | ............... | G01N 27/025 324/654 |
| 2016/0123772 A1 * | 5/2016 | Sugino | ............... | G01D 5/20 324/207.21 |
| 2016/0254716 A1 * | 9/2016 | Kim | ............... | H02K 29/08 310/68 B |
| 2016/0290831 A1 * | 10/2016 | Ohr | ............... | G01D 5/20 |
| 2017/0139202 A1 * | 5/2017 | Van Biesen | ............... | G02B 26/08 |

\* cited by examiner

METHOD FOR ASCERTAINING A POSITION OF A ROTOR OF AN ELECTRICAL MACHINE

CROSS REFERENCE

The present application claims the benefit under 35 U.S.C. § 119 of German Patent Application No. DE 102015214596.4 filed on Jul. 31, 2015, which is expressly incorporated herein by reference in its entirety.

FIELD

The present invention relates to a method for ascertaining a position of a rotor of an electrical machine, as well as to a processing unit and a computer program for the implementation thereof.

BACKGROUND INFORMATION

Electrical machines having a permanently excited rotor and a winding for the stator, in particular what are generally known as brushless direct-current motors, can be controlled by a microcontroller, for example. In response to switching off of the electrical machine, the rotor thereof can reach any position at all. Even here, there is generally no preferential position.

Since an initial commutation must always be performed when the electrical machine is switched on, the situation can, therefore, arise whereby the rotor at first briefly moves in the wrong direction when the exact position of the rotor is not known, so that it is also not known which commutation is to be performed.

As a result, fuel can initially be delivered in the wrong direction, particularly when such an electrical machine is used in fuel-delivery systems, such as in a motor vehicle.

SUMMARY

The present invention provides a method for ascertaining a position of a rotor of an electrical machine, as well as a processing unit and a computer program for the implementation thereof. Advantageous embodiments are described below.

The present invention provides a method for ascertaining a position of a rotor relative to a stator of an electrical machine having a permanently excited rotor and a plurality of windings for the stator or vice versa, i.e., having a permanently excited stator and a plurality of windings for the rotor. In particular, the electrical machine may be a brushless direct-current motor. In response to an energization of at least one of the windings, a change in an inductance of the at least one winding is effected; this is ascertained, and, on the basis of the change in the inductance of the at least one winding, the position of the rotor is determined relative to the stator. In particular, the change in the inductance of the at least one winding may be determined by ascertaining a change in the magnetic flux density induced by the energization, which, in particular, includes a plurality of current pulses. In particular, a plurality or all of the windings may also be energized accordingly, and the change in the inductance thereof ascertained.

The present invention makes use of the fact that the inductance of the winding is a function of the relative permeability of a material in the area of the winding. The relative permeability, in turn, in particular for ferromagnetic materials, especially iron, is not a linear function. Rather, the magnetic flux density, which, relative to the underlying magnetic field strength, determines the relative permeability, is a nonlinear function of this magnetic field strength. For high magnetic fields, in particular, the magnetic flux density increases only slightly with increasing magnetic field strength. This is very clearly discernible in light of what is generally known as the magnetization curve of iron, for example.

In the case of an electrical machine, as described above, the magnetic field strength prevailing at the location of the winding, respectively of one of a plurality of windings, is a superposition of a magnetic field strength generated by one or a plurality of permanent magnet(s) of the rotor or of the stator and of a magnetic field strength induced by an energization of the winding. If, at this point, a predetermined current magnitude, for example, is applied to the winding, then the thereby induced magnetic flux density depends on the entire magnetic field strength, i.e., the magnetic field strength induced by the energization and the magnetic field strength induced by the permanent magnet(s). Thus, due to the nonlinearity of the mentioned function, the change in the magnetic flux density and thus the inductance are a function of the magnetic field strength component induced by the permanent magnet(s). This component, in turn, is a function of the position of the rotor (or of the stator) relative to the winding and thus of the stator (respectively, of the rotor). To illustrate this effect, reference is made here to the figures, respectively to the corresponding description.

The change in the inductance, respectively in the magnetic flux density may be ascertained in different ways. In particular, the method described here for ascertaining the position of the rotor is not dependent on the method selected for determining the change in the inductance, respectively in the magnetic flux density. Thus, the inductance and the change in the same may be ascertained, for example, by applying a voltage pulse and then recording a current pulse.

The current used to energize the winding is preferably so low in magnitude that the rotor of the electrical machine does not rotate. For this, the current may be within the range of a few mA, for example, from 0.5 mA to 20.0 mA, for instance. The magnetic field strength induced by this current suffices for ascertaining the change in the inductance, however, not for moving the rotor against the frictional force. A position of the stationary rotor may thus be readily ascertained.

The change in the inductance is advantageously ascertained taking into account a known magnetization characteristic of a material that influences the inductance of the winding. The magnetization characteristic of the material may be considered, in particular on the basis of a model and/or performance data. Here, the fact may be utilized that the magnetization characteristic, respectively the associated magnetization curve, respectively demagnetization curve of the material are typically known. Otherwise, this curve may also be ascertained in the course of measurements, for example. Thus, the position of the rotor may be determined very accurately and simply.

A ferromagnetic material, in particular iron, may be advantageously used as material. A very pronounced nonlinearity of the relative permeability is evident here, which makes the change in the inductance very readily ascertainable. Apart from that, iron is often used as a holder and/or core for the winding.

When the position of the rotor is determined relative to the stator, it is advantageous to allow for a magnetic field strength generated by one or a plurality of permanent magnet(s) of the rotor or of the stator in the area of the at least one winding. The magnetic field strength of the permanent magnets in the area of the winding is a function of the distance of the permanent magnets among themselves and to the winding. For an electrical machine, however, the exact configuration is known that may be used to calculate the magnetic field strength in the area of the winding, for example. However, it is also possible to use test measurements, for example, to ascertain the magnetic field strength in the area of the winding. Thus, the position of a rotor may be thereby inferred very accurately as a function of the change in the inductance.

The ascertained position of a rotor relative to the stator is preferably used for an initial commutation process during an operation of the electrical machine. It is thereby possible to prevent the rotor from potentially rotating briefly in the wrong direction when the electrical machine is switched on.

The electrical machine is advantageously used to operate an electrically operated fuel pump, in particular in a fuel system of a motor vehicle. The fuel pump may be an electrically operated gear pump, for example. A rotor rotation in the wrong direction is disadvantageous, especially in the case of fuel pumps in motor vehicles, since fuel is thereby delivered in the wrong direction, i.e., away from an internal combustion engine, instead of toward an internal combustion engine. This could result in misfirings during operation of the internal combustion engine.

A processing unit according to the present invention, for example, a control unit of a motor vehicle, in particular an engine control unit or a pump control unit, is adapted, in particular in terms of software engineering, for implementing a method according to the present invention.

The method is advantageously implemented as a computer program, since this entails especially low costs, particularly when an executing control unit is also used for other tasks and is, therefore, present anyway. Suitable storage media for providing the computer program include, in particular, magnetic, optical and electrical memories, for example, such as hard disks, flash memories, EEPROMs, DVDs, inter alia. A program may also be downloaded over computer networks (Internet, intranet, etc.).

Other advantages and embodiments of the present invention are derived from the description and the figures.

The present invention is schematically illustrated in the figures with reference to an exemplary embodiment and is described in the following with reference to the figures.

DETAILED DESCRIPTION OF EXAMPLE EMBODIMENTS

Figure 1:
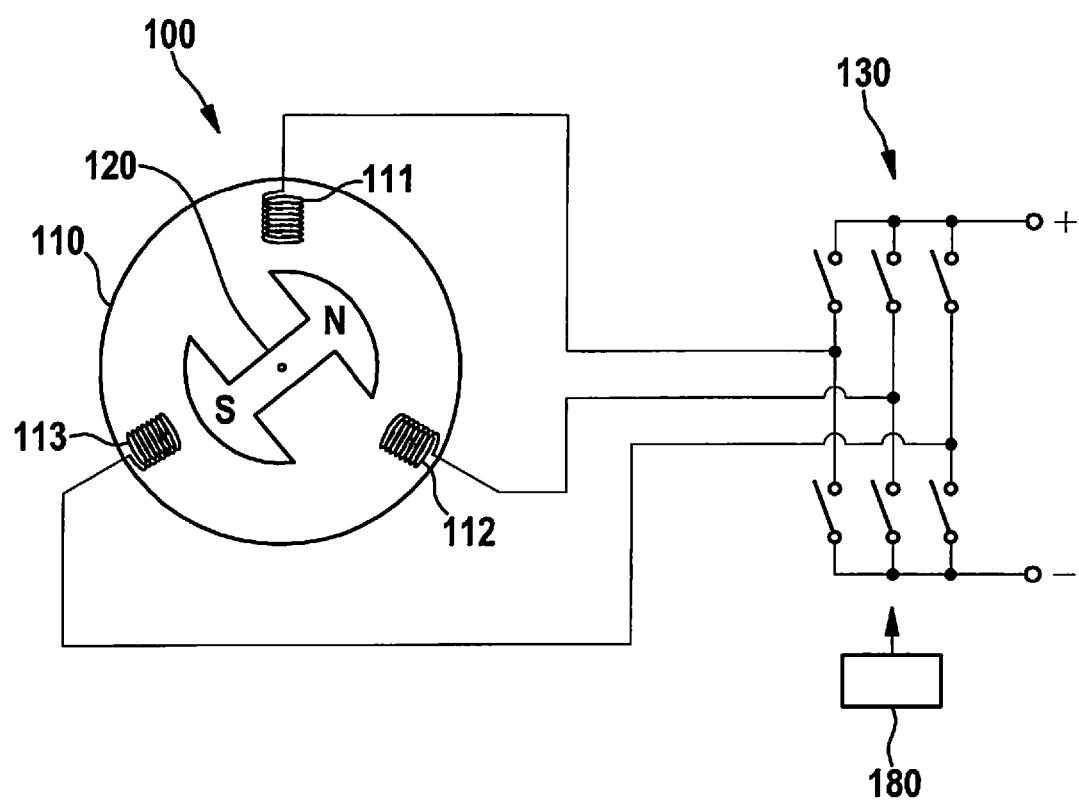
FIG. 1 shows schematically and in simplified form an electrical machine that is suited for implementing a method according to the present invention.

Schematically and in simplified form, FIG. 1 shows an electrical machine 100 that is suited for implementing a method according to the present invention. Here, electrical machine 100 is a brushless direct-current motor.

Electrical machine 100 has a stator 110, which, in turn, exemplarily includes three windings 111, 112, 113. Electrical machine 100 also has a rotor 120, which includes a permanent magnet that is apparent by the designations N and S for north pole and south pole.

Also shown is a circuit configuration 130 having three windings 111, 112, 113 connected thereto. The circuit configuration has six switches for connecting the three windings alternatingly to positive and negative voltage, for example. For this purpose, processing unit 180 may drive circuit configuration 130 and, in particular, the switches. In other respects, the operating principle of such an electrical machine is known per se and will, therefore, not be described in greater detail here.

Figure 2:
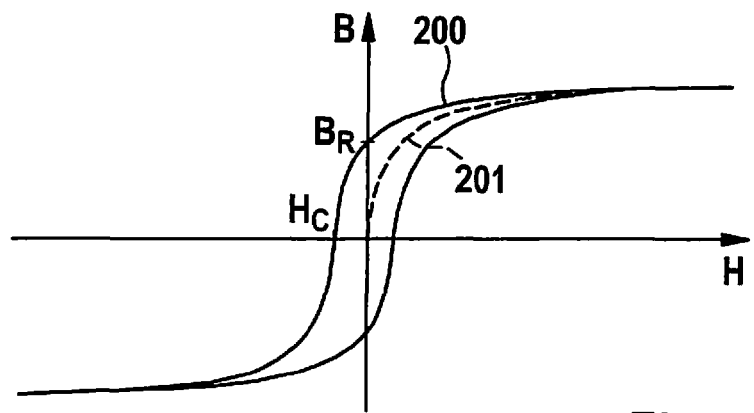
FIG. 2 through 4 show magnetization curves of a ferromagnetic material.

A magnetization curve 200 for a ferromagnetic material, for example, iron, is shown exemplarily in FIG. 2. In this regard, a magnetic flux density B is plotted over a magnetic field strength H.

Magnetization curve 200 describes the relationship between the magnetic flux density and the magnetic field strength prevailing in the area of the material. Without previous magnetization, the profile of curve B(H) corresponds to illustrated section 201; i.e., magnetic flux density B initially increases substantially with increasing magnetic field strength H, but goes into a saturation.

In response to a subsequent reversal of magnetic field strength H, at H=0, magnetic field strength reaches value B=$B_R$, what is generally referred to as remanence. Only at value H=$-H_C$, of what is generally referred to as coercive field strength, does the magnetic flux density reach value B=0. In the further course of the process, the magnetic flux density goes into saturation again. Upon renewed reversal of the magnetic field strength, the magnetic flux density again exceeds value B=0 and reaches saturation.

From the profile of magnetization curve 200, it is clearly discernible that magnetic flux density B is markedly nonlinear as a function of magnetic field strength H, thus B(H).

Figure 3:
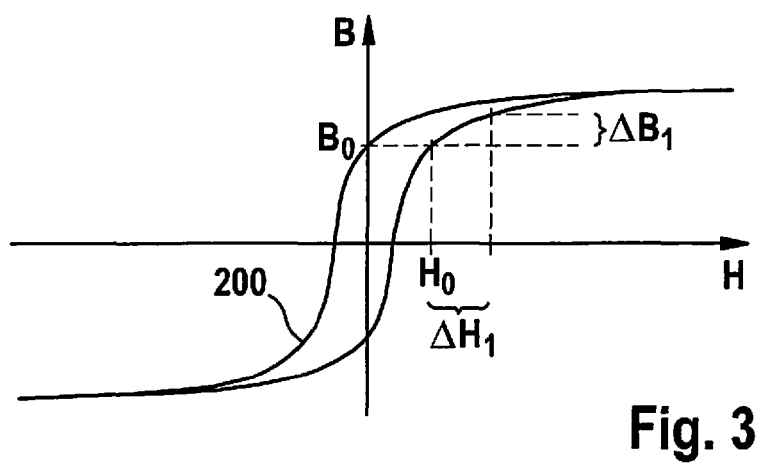

Magnetization curve 200 from FIG. 2 is again shown in FIG. 3. A value $H_0$ of magnetic field strength H is also shown that induces a value $B_0$ of magnetic flux density B in accordance with magnetization curve 200.

This value $H_0$ may be the value of the magnetic field strength at this point, as induced by one or a plurality of permanent magnet(s) of the rotor of an electrical machine in the area of a winding at a specific position of the rotor relative to the stator, respectively to the winding.

Also shown is a value $\Delta H_1$ of a magnetic field strength, as may be induced, for example, by an energization, for example, a current pulse through the winding in the area of the winding. Thus, the resulting magnetic field strength in the area of the winding corresponds to H=$H_0$+$\Delta H_1$. In accordance with magnetization curve 200, the thereby induced magnetic flux density has a value B=$B_0$+$\Delta B_1$, component $\Delta B_1$ corresponding to the component of the magnetic flux density induced by component $\Delta H_1$ in response to energization of the winding.

While the magnetic field strength, that is induced by an energization of the winding, is expressed by $$H = \frac{I \times N}{l_W},$$

the current in the winding being able to be calculated by I, the number of windings of the winding by N, and the length of the winding by $l_w$; the magnetic flux density may be expressed by $$B = \frac{I \times N}{l_w} \mu_0 \mu_r,$$

$\mu_0$ indicating the permeability of the vacuum and $\mu_r$ the relative permeability of the material in the area of the winding, in particular of a core of the winding.

Since $\mu_0$ is constant, the nonlinearity of function B(H) is thus only described by $\mu_r$. It is also known that the inductance of the winding is expressed by $$L = \frac{\mu_0 \cdot \mu_r \cdot A \cdot N^2}{l_w},$$

the cross-sectional area of the winding being able to be calculated by A. This means that inductance L is generally directly proportional to relative permeability $\mu_r$.

Taking the above formulas into consideration, it is thus derived that magnetic field strength $\Delta H_1$ produced by the energization of the winding induces a change in the inductance or also what is generally referred to as a differential inductance, that may be ascertained by $\Delta B_1$ and $\Delta H_1$.

For this, two different, advantageously opposite current pulses may be used, for example, and the time characteristic thereof measured. Different direct currents having a superimposed alternating-current component may be used for measuring inductance. For the currents that differ in magnitude and/or direction, characteristic measurement signals are derived that each correspond to a changed inductance value (seethe above formula). From the differences in the inductance values, the differential inductance is obtained. It changes systematically as a function of the nonlinearity in the ferromagnetic material and the magnetic field of the permanent magnets.

In particular, it is also discernible that the ascertained differential inductance is a function of value $H_0$ and thus of the position of the rotor relative to the stator. Thus, value $H_0$ may be ascertained by assigning the ascertained differential inductance to the magnetization curve. The magnetization curve corresponding to the electrical machine may thereby be stored in a control unit, fur example, and be used for a calculation. Thus, the position of the rotor may be ascertained by properly assigning value $H_0$ (or also $B_0$) to the position of the rotor by ascertaining the differential inductance.

Figure 4:
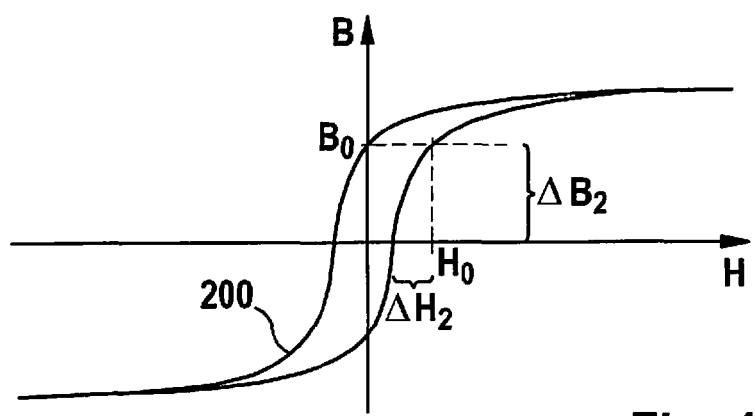

Magnetization curve 200 from FIG. 2 or 3 is again shown in FIG. 4. Values $H_0$ of magnetic field strength H or $B_0$ of magnetic flux density B are also shown here, as explained above with reference to FIG. 3.

Also shown is a value $\Delta H_2$ of a magnetic field strength, as may be induced, for example, by an energization, for example, a current pulse through the winding in the area of the winding. Thus, the resulting magnetic field strength in the area of the winding corresponds to $H=H_0+\Delta H_2$. The current pulse used for the energization does, in fact, have the same magnitude here as in the case of FIG. 3, for example, but the opposite sign.

In accordance with magnetization curve 200, the thereby induced magnetic flux density has a value $B=B_0-\Delta B_2$, component $\Delta B_2$ corresponding to the component of the magnetic flux density induced by component $\Delta H_2$ in response to energization of the winding.

Taking the above formulas into consideration, it is derived here as well that magnetic field strength $\Delta H_2$ produced by the energization of the winding induces a change in the inductance that may be ascertained by $\Delta B_2$ and $\Delta H_2$.

In comparison to FIG. 3, it is discernible here that the energization is, in fact, performed using the same current magnitude, but the differential inductance deviates appreciably.

In particular, in the course of energization of the winding, for example, two current pulses of the same magnitude, but opposite polarity are emitted, as is discernible, for example, on the basis of FIGS. 3 and 4. Thus, value $H_0$ may be more accurately determined by assigning the two ascertained differential inductances to the magnetization curve.

It is understood that the method may also be implemented correspondingly for other or for all windings of the electrical machine, thereby making it possible to more accurately determine the position of the rotor.

Figure 5:
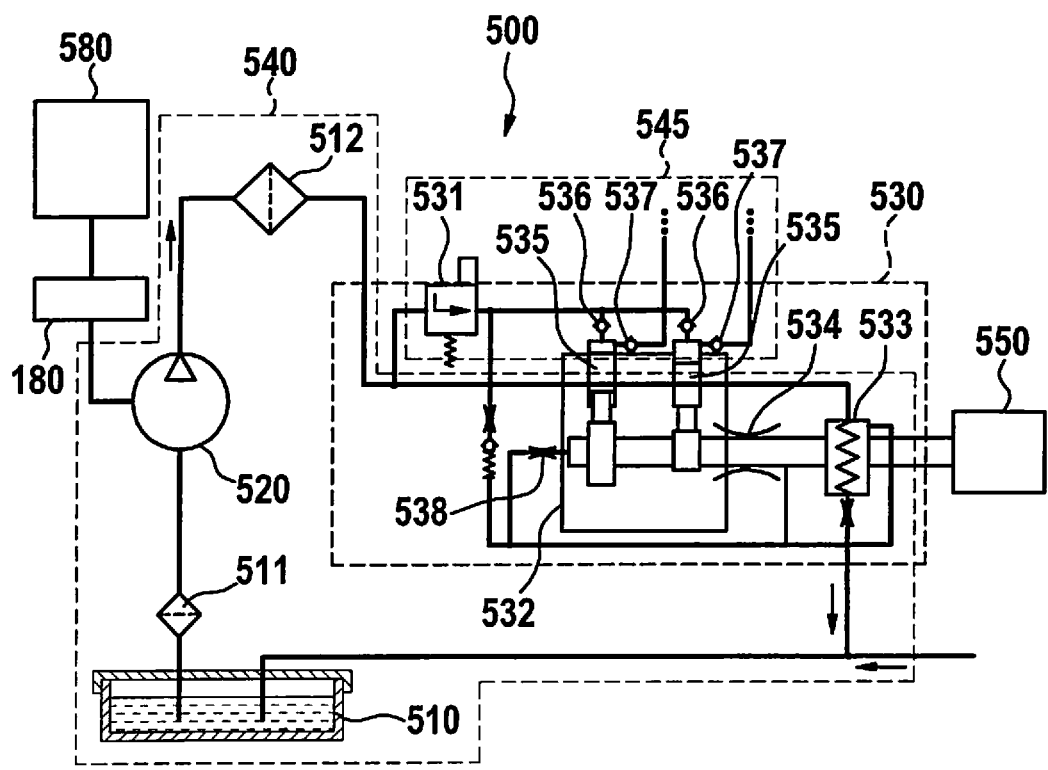
FIG. 5 shows schematically a portion of a fuel delivery system having an electrical fuel pump including an electrical machine that is suited for implementing a method according to the present invention.

FIG. 5 shows schematically and exemplarily a portion of a fuel supply system 500 of an internal combustion engine of a motor vehicle having an electrical fuel pump 520. Fuel from a fuel tank 510 is thereby delivered by fuel pump 520 via two filters 511 and 512 to a high-pressure pump 530.

In high-pressure pump 530 included in a further fuel circuit in the form of a high-pressure fuel circuit 545, the fuel is fed via a fuel-delivery controller 531 and two intake valves 536 to two pistons 535 configured in a drive chamber 532. The two pistons 535 are coupled to internal combustion engine 550 and are driven by the same. The fuel may be fed via outlet valves 537 to a high-pressure accumulator (not shown here), for example.

Also shown are an overflow valve 533, as well as exemplarily two bearing leakages 534 and 538, via which fuel flows back into fuel tank 510. Fuel is able to flow via overflow valve 533, on the one hand, consistently over a small discharge channel at a low volumetric flow rate, for example to cool high-pressure pump 530, as well as in the open state, at a high volumetric flow rate.

Electrical fuel pump 520 may be a fuel pump driven by an electrical machine 100, for example, as shown in FIG. 1. Thus, a method according to the present invention may also be implemented for electrical fuel pump 520. Fuel pump 520 is used here as a presupply pump that is located in a low-pressure fuel circuit 540 of fuel supply system 500.

Low-pressure fuel circuit 540 includes fuel tank 510, filters 511, 512, fuel pump 520, as well as overflow valve 533. For the sake of completeness, it should be noted that low-pressure fuel circuit 540 may also partially pass through the housing of high-pressure pump 530, for example, for the cooling thereof. Fuel pump 520 may be an electrically operated gear pump, for example.

Associated with fuel pump 520 is a pump control unit 180 that is provided for controlling and/or regulating fuel pump 520 and, for that purpose, has suitable equipment, such as a microcontroller, metrology and appropriate software. Metrology may be used, in particular, to record a flow that is prevailing, respectively streaming during operation of fuel pump 520. In particular, pump control unit 180 may also be a processing unit that is used for controlling electrical machine 100, as shown in FIG. 1.

An engine control unit 580 is also provided to which pump control unit 180 is linked by data transmission. In the course of controlling the internal combustion engine that is supplied with fuel via fuel supply system 500, engine control unit 580 issues appropriate commands, such as a rotational speed or a volumetric flow rate, to pump control unit 180, thereby controlling fuel pump 520 in the desired manner.

In the fuel circuit shown, a method according to the present invention makes it possible to prevent fuel from being initially delivered in the wrong direction when the fuel pump is turned on.

What is claimed is:

1. A method for ascertaining a position of a rotor relative to a stator of an electrical machine having a permanently excited rotor and a plurality of windings for the stator or vice versa, the method comprising:
    inducing, in response to an energization of at least one of the windings, a change in an inductance of the winding;
    determining, via a processing unit, the change in the inductance of the winding; and
    ascertaining, via the processing unit, based on the change in the inductance of the winding, the position of the rotor relative to the stator;
    wherein the processing unit determines a change in the inductance of the at least one winding by ascertaining a change in the magnetic flux density induced by the energization using a plurality of current pulses,
    wherein the current used to energize the winding is so low in magnitude that the rotor of the electrical machine does not rotate,
    wherein the processing unit drives a circuit configuration having switches for connecting the plurality of windings to a voltage, and
    wherein the ascertained position of the rotor relative to the stator is used for an initial commutation process during an operation of the electrical machine, so as to prevent the rotor from rotating briefly in a wrong direction when the electrical machine is switched on.

2. The method as recited in claim 1, wherein the change in the inductance is ascertained taking into account a magnetization characteristic of a material that influences the inductance of the at least one winding.

3. The method as recited in claim 2, wherein the magnetization characteristic of the material is considered based on at least one of a model and performance data.

4. The method as recited in claim 2, wherein a ferromagnetic material is used as the material.

5. The method as recited in claim 1, wherein a magnetic field strength generated by at least one permanent magnet of the rotor or of the stator, in the area of the at least one winding, is taken into account upon determining the position of the rotor relative to the stator.

6. The method as recited in claim 1, wherein the ascertained position of the rotor relative to the stator being used for an initial commutation process during an operation of the electrical machine.

7. The method as recited in claim 1, wherein the electrical machine is used to operate an electrically operated fuel pump.

8. A processing unit for ascertaining a position of a rotor relative to a stator of an electrical machine having a permanently excited rotor and a plurality of windings for the stator or vice versa, comprising:
    a processing arrangement adapted to perform the following:
        induce, in response to an energization of at least one of the windings, a change in an inductance of the winding;
        determine the change in the inductance of the winding; and
        ascertain, based on the change in the inductance of the winding, the position of the rotor relative to the stator;
        wherein the change in the inductance of the at least one winding is determined by ascertaining a change in the magnetic flux density induced by the energization using a plurality of current pulses, and
        wherein the current used to energize the winding is so low in magnitude that the rotor of the electrical machine does not rotate,
        wherein the processing unit drives a circuit configuration having switches for connecting the plurality of windings to a voltage, and
        wherein the ascertained position of the rotor relative to the stator is used for an initial commutation process during an operation of the electrical machine, so as to prevent the rotor from rotating briefly in a wrong direction when the electrical machine is switched on.

9. A non-transitory machine-readable storage medium having a computer program, which is executable by a processor, comprising:
    a program code arrangement having program code for ascertaining a position of a rotor relative to a stator of an electrical machine having a permanently excited rotor and a plurality of windings for the stator or vice versa, by performing the following:
        inducing, in response to an energization of at least one of the windings, a change in an inductance of the winding;
        determining the change in the inductance of the winding; and
        ascertaining, based on the change in the inductance of the winding, the position of the rotor relative to the stator;
        wherein the change in the inductance of the at least one winding is determined by ascertaining a change in the magnetic flux density induced by the energization using a plurality of current pulses, and
        wherein the current used to energize the winding is so low in magnitude that the rotor of the electrical machine does not rotate,
        wherein the processing unit drives a circuit configuration having switches for connecting the plurality of windings to a voltage, and
        wherein the ascertained position of the rotor relative to the stator is used for an initial commutation process during an operation of the electrical machine, so as to prevent the rotor from rotating briefly in a wrong direction when the electrical machine is switched on.

* * * * *